US011302467B2

(12) United States Patent
Ghasemi et al.

(10) Patent No.: US 11,302,467 B2
(45) Date of Patent: Apr. 12, 2022

(54) MAGNETIC SURFACES AND USES THEREOF

(71) Applicant: University of Houston System, Houston, TX (US)

(72) Inventors: Hadi Ghasemi, Houston, TX (US); Peyman Irajizad, Houston, TX (US); Munib Hasnain, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 431 days.

(21) Appl. No.: 16/087,742

(22) PCT Filed: Mar. 21, 2017

(86) PCT No.: PCT/US2017/023338
§ 371 (c)(1),
(2) Date: Sep. 24, 2018

(87) PCT Pub. No.: WO2017/172409
PCT Pub. Date: Oct. 5, 2017

(65) Prior Publication Data

US 2020/0126699 A1 Apr. 23, 2020

Related U.S. Application Data

(60) Provisional application No. 62/410,199, filed on Oct. 19, 2016, provisional application No. 62/313,893, filed on Mar. 28, 2016.

(51) Int. Cl.

| | |
|---|---|
| ***G01N 1/10*** | (2006.01) |
| ***H01F 1/44*** | (2006.01) |
| ***H01F 41/24*** | (2006.01) |
| *H01F 1/00* | (2006.01) |

(52) U.S. Cl.
CPC ............. *H01F 1/447* (2013.01); *H01F 41/24* (2013.01); *H01F 1/0054* (2013.01)

(58) Field of Classification Search
CPC ..................... B01L 2400/04; B01L 2200/0605
USPC ........................................ 436/180; 422/82.12
See application file for complete search history.

(56) References Cited

U.S. PATENT DOCUMENTS

| | | | | |
|---|---|---|---|---|
| 2006/0197052 | A1 * | 9/2006 | Pugel | B82Y 30/00 252/62.55 |
| 2006/0246224 | A1 | 11/2006 | Neitzel | |
| 2013/0034695 | A1 * | 2/2013 | Smith | F28F 19/006 428/143 |

OTHER PUBLICATIONS

Notification of Transmittal of the International Preliminary Report on Patentability for PCT/US2017/023338 dated Oct. 11, 2018 from the International Bureau of WIPO, containing the Written Opinion of the International Searching Authority—Korea, dated Jun. 20, 2017, 13 pages.

* cited by examiner

*Primary Examiner* — Natalia Levkovich
(74) *Attorney, Agent, or Firm* — Jackson Walker LLP

(57) ABSTRACT

Modified surfaces of the present disclosure include a surface or substrate material, a magnetic field, which may be generated through the use of a magnet placed at a distance beneath the surface or substrate, or placed above the surface or substrate, or through the use of a magnetic surface or substrate, and a magnetic fluid, such as ferrofluid or ferrogel, deposited in a layer on the top of the surface or substrate. The modified surfaces may be icephobic. In addition, a droplet of liquid placed on the modified surface can be manipulated through placement of a local heat source in proximity to the droplet, without contacting the droplet.

4 Claims, 13 Drawing Sheets

MAGNETIC SURFACES AND USES THEREOF

This application claims priority to U.S. Provisional Patent Application No. 62/313,893, entitled "Magnetic Icephobic Surfaces," filed on Mar. 28, 2016, and U.S. Provisional Patent Application No. 62/410,199, entitled "Systems and Methods for Remote Droplet Manipulation," filed on Oct. 19, 2016, the entire contents of which are hereby incorporated by reference.

BACKGROUND

This disclosure pertains to manipulation of liquids on surfaces, particularly to methods and systems for creating an icephobic surface that is resistant to the formation of ice even at low temperatures as well as specialized surfaces that are thermally-activated, self-healing and that allow for remote droplet manipulation using any source of thermal actuation.

The formation of ice on surfaces negatively impacts many aspects of life, from the operation of cars, planes, trains, and ocean-going vessels, to roads, power lines, transmission towers, turbines, wind mills, and roofs of all types of structures. Thus, the problems caused by ice formation produce difficulties in most major sectors of society. It has been reported that about 40 percent of road accidents in winter were related to wetness, ice, or snow. Icing on the wings and surfaces of aircrafts may cause accidents. Aircrafts intercept super cooled water droplets when flying through clouds or encountering freezing rain and the impacting water freezes rapidly to form an ice accretion. The ice accretion results in drag increase and sometimes may lead to dangerous loss of lift force, which may cause tragic accidents.

Icephobic surfaces are characterized by their reduced median nucleation temperature and increased average ice nucleation delay time. These surfaces are being developed for a wide range of applications including solar panels, wind turbines, aircraft, automobiles and roofs. It is important to develop universal icephobic surfaces that are durable and effective in each of these applications. Therefore, the surfaces must withstand a wide range of weathering conditions. In general, icephobic surfaces must be scalable, environmentally friendly, and mechanically durable.

Making surfaces that is completely ice repellant under any circumstance is an unmet challenge. Several surfaces have been investigated in order to increase ice repellency. For instance, micro-nanostructured surfaces, slippery liquid infused surfaces (SLIPS), and superhydrophobic surfaces have been proposed.

Droplet manipulation on a surface is a crucial phenomenon in a broad spectrum of disciplines from energy and water systems, chemical micro-reactors, droplet-based microfluidics to biosciences. In these embodiments, droplet manipulation is required for transporting, guiding, removing, splitting, merging, or trapping of droplets for intended physical and chemical interactions. A variety of approaches have been developed for controlled droplet manipulation including surface tension-driven convection (thermal, chemical and electrical), vibration, dielectrophoresis (DEP), superhydrophobic tracks, electrically-tunable defects, acoustic droplet actuation, optoelectrowetting, and vapor-assisted motion.

Although in these previously existing approaches, surface characteristics are tuned to control the droplet motion, droplet manipulation could be achieved through tuning the surface features of the moving droplet as well. Liquid marbles, which are liquid droplets encapsulated by liquid-repellant particles, have shown low-friction motion on a surface. Furthermore, magnetic type of these liquid marbles are developed to be manipulated by a magnetic field. However, there are several limitations on these approaches including custom fabrication of the solid surface (e.g. physical or chemical modification and micro/nano fabrication) and enhanced friction by pinning and hysteresis of the droplet on a solid surface. To reduce friction during droplet motion on a surface and fast propulsion of a droplet, liquid platforms are suggested, in which the droplet rolls or moves on a layer of immiscible fluid. Recently, this form of low-friction motion has been shown on heater-embedded solid substrate and light-activated liquid marbles. The physics behind droplet motion by both of these approaches is surface tension driven convection. Similar to the solid substrates for droplet manipulation, these liquid-based approaches require either custom-fabrication of the solid substrate or inclusion of hydrophobic particles for the liquid marbles.

Ideally, a method for remote droplet manipulation should allow for high mobility that is independent of the viscosity of the liquid droplet and does not require custom fabrication of the surface.

SUMMARY

The present disclosure relates generally to surfaces having anti-icing characteristics and high mobility for liquid and ice droplets. In particular, the present disclosure pertains to a surface that includes a thin film of magnetic liquid on a magnetic solid substrate. The present disclosure also pertains to surfaces that are icephobic and that allow for remote droplet manipulation.

In preferred embodiments of the surface, a thin film of magnetic liquid provides an intrinsically smooth and defect-free surface down to molecular scale. A magnetic solid substrate imposes a volumetric force to the thin film to lock this film on the surface. In preferred embodiments, the induced magnetic field by the solid may be as low as a few mT. The use of magnetic liquids, such as but not limited to ferrofluids, is ideal because (1) it provides a magnetic volumetric force once exposed to a magnetic field to lock the thin film; (2) magnetic liquids are self-healing in the presence of a magnetic field; (3) volumetric force ensures durability of these surfaces under high shear stresses; (4) oil-based magnetic liquids have a very low evaporation rate allowing for longevity; and (5) a magnetic thin film can be applied to a wide range of surfaces (metals, ceramics, and polymers) with no required micro/nano fabrication, thereby lowering production costs.

The surfaces described herein are able to manipulate liquids that come into contact with the surfaces in a number of different ways. In certain examples, the modified surfaces can be icephobic and can reduce the formation of ice on the surfaces. In additional examples, the modified surfaces can be used to remotely manipulate liquid droplets on the surfaces with high mobility through gravitational or thermal stimulus.

In some embodiments, the modified surfaces described herein can be universally applicable icephobic surfaces that take advantage of magnetic fluid and liquid-liquid interactions to dramatically reduce the median nucleation temperature of ice and increase the freezing delay time of water. The surface or substrate upon which the magnetic fluid is placed has no effect on performance. Thus, the magnetic icephobic surfaces are universally applicable.

In preferred embodiments, the surfaces of the present disclosure include a surface or substrate material, a magnetic field, which may be generated through the use of a magnet placed beneath the surface or substrate, and a ferrofluid film deposited in a layer on the top of the surface or substrate, on the side where the surface is expected to encounter freezing water. With increased magnetic field, the median nucleation temperature for water placed on the magnetic icephobic surface is decreased and the average freezing delay is increased. Due to the liquid nature of the ferrofluid, water is moved away from the surface or substrate, and the slightest force or degree of surface tilt removes any ice that forms.

Existing icephobic surfaces typically require micro or nano-texturing to achieve icephobicity. The present modified surfaces are easily manufactured and do not require such texturing. The present surfaces utilize a liquid layer, but they do not use micro or nano-texturing to hold the liquid layer in place. The present magnetic icephobic surfaces utilize interactions between two liquids, whereas other icephobic surfaces depend upon the interaction between a solid and a liquid. Without wanting to be bound by theory, the liquid-liquid interaction between the oil-based ferrofluid and water is believed to be the reason why the present surfaces are able to obtain remarkably low nucleation temperature and extended freezing delays. The surfaces are universally applicable. The surface or substrate upon which the magnetic fluid is placed has no effect on performance. The present surfaces are also easily manufactured. Any liquid can be manipulated using the modified magnetic surfaces, regardless of viscosity.

Furthermore, while most icephobic surfaces have a limited lifespan due to the micro or nano-texturing being mechanically damaged, or due to the depletion of liquid layers held in by the texturing, the present surfaces have a much longer lifespan than these existing textured technologies. The present surfaces can withstand high shear stresses and are self-healing, meaning that any damage done to the magnetic fluid is repaired without external interaction due to the existence of a magnetic field.

The surfaces described herein offer a robust and durable approach to icephobicity that can be applicable in various operations and infrastructures including transportation, power transmission lines, energy systems, and roofing. The present surfaces have achieved record low nucleation temperatures and freezing delays well over twenty-four hours. Thus, the present surfaces provide superior icephobicity relative to existing icephobic surfaces. Ice formation can be effectively prevented by incorporating the present surfaces into any cold surface or any surface in a cold environment.

In additional embodiments, the surfaces can also be utilized for the high mobility remote manipulation of liquid droplets. Once an immiscible droplet sits on the modified surface, the upward volumetric force on the magnetic liquid film does not allow impregnation of the droplet in the thin film and formation of solid-liquid interface. Thus, the droplet floats on the thin magnetic liquid film and a liquid-liquid interface is formed which has extremely low friction. Once a local heat source is brought close to the modified surface, through radiation and conduction, a temperature gradient is developed. This temperature gradient leads to a gradient in surface tension and consequently a motion is induced at the surface (Marangoni convection). This motion of magnetic liquid at the surface carries the droplet away from the local heat source. That is, motion of the droplet on the surface requires only a temperature gradient, which is introduced by a remote heat source. It should be emphasized that a laser can also act as the heat source. Note that no prior surface treatment of solid is required for the modified magnetic surface.

In preferred embodiments, the modified surfaces of the present disclosure include a surface or substrate material, a magnetic field, which may be generated through the use of a magnet placed beneath the surface or substrate or by the substrate itself, and a magnetic liquid deposited in a layer on the top of the surface or substrate, on the side where the surface will encounter the liquid.

DETAILED DESCRIPTION OF PREFERRED EMBODIMENTS

The present disclosure relates to surfaces and particularly to modified magnetic surfaces that use a magnetic field and ferro-material. The surfaces can be icephobic surfaces and can also allow for remote liquid droplet manipulation with high mobility.

Figure 1A:
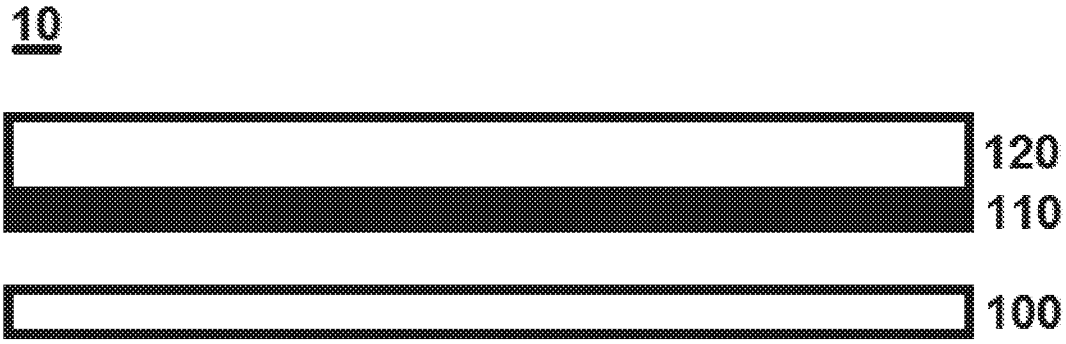
FIG. 1A shows a diagram of an exemplary modified surface in accordance with preferred embodiments disclosed herein.

FIG. 1A is a diagram of a preferred embodiment of a surface 10 in accordance with the present disclosure. The modified surface 10 includes a magnet 100 that can be located underneath a substrate 110. In preferred embodiments, the magnet may be a neodymium magnet, but any suitable magnetic will work, such as magnetic tape. The substrate 110 can be made of any material. On an upper surface of the substrate 110 is a layer of magnetic fluid 120. The magnetic fluid can be in the form of any Newtonian or non-Newtonian fluid, including both liquids and gels. The magnetic field (not explicitly shown in FIG. 1A) generated by the magnet 100 must contact the layer of magnetic fluid. Thus, the magnet must be a suitable distance from the substrate. The length of the magnet 100 should be varied to approximate the length of the substrate 110, or to provide a desired length of surface 10 having the attributes described herein.

Figure 1B:
FIG. 1B shows a diagram of a further exemplary modified surface in accordance with preferred embodiments disclosed herein.
Figure 1C:
FIG. 1C shows a diagram of a further exemplary modified surface in accordance with preferred embodiments disclosed herein.

FIG. 1B is a diagram of an additional preferred embodiment of a surface 20 in accordance with the present disclosure. In this embodiment, the surface 20 includes a magnet 200 that is on top of substrate 210 and magnetic fluid 220 directly on top of magnet 200. FIG. 1C is a diagram of a further preferred embodiment of a surface 30 in accordance with the present disclosure. In this embodiment, a magnetic substrate 330 is used, meaning there is no need for a separate magnet and substrate, with magnetic fluid 320 on top of magnetic substrate 330.

The present surfaces include a magnetic fluid coated surface, which utilizes the interaction of liquid-liquid interfaces, and a magnetic field. In some embodiments, the magnetic fluid is a ferrofluid. In additional embodiments, the magnetic fluid is any non-Newtonian fluid, such as a ferrogel. Ferrofluid is a fluid containing a magnetic suspension that can be manipulated by a magnetic field in the same way iron can be manipulated by a magnetic field. A ferrofluid becomes strongly polarized or magnetized in the presence of a magnetic field. When ferrofluid is exposed to a magnetic field, due to magnetic force, this liquid is attracted to the magnet. The ferrofluid useful in the present modified surfaces includes nanoparticles suspended in a carrier fluid that is oil-based and hydrophobic. The nanoparticles in ferrofluid are typically particles of magnetite, hematite, or other compounds that contain iron, and have diameters that are 10 nanometers or less. They are dispersed within the carrier fluid through the use of a surfactant, making the ferrofluid a colloidal suspension. Any type of ferrofluid can be used with the present surfaces. In other embodiments, the magnetic fluid is not a ferrofluid and may be a magnetic ionic liquid, ferrogel, or other suitable magnetic fluid.

Figure 2A:
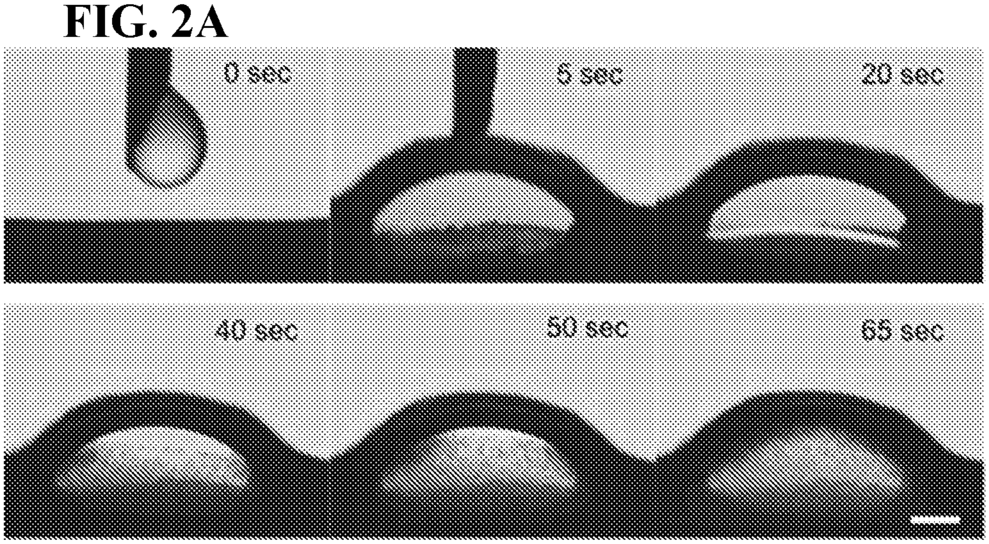
FIG. 2A shows a high resolution photograph of ice formation by a water droplet on a ferrofluid layer over time with no magnetic field present at −25° C.
Figure 2B:
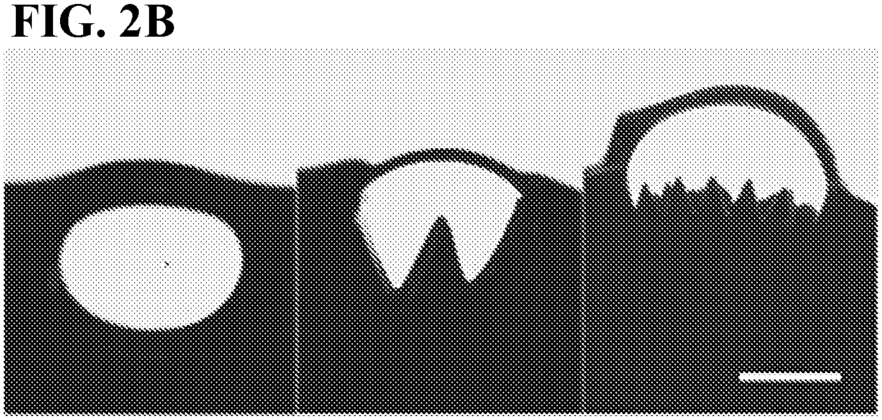
FIG. 2B shows a high resolution photograph of a water droplet in ferrofluid when subjected to increasing magnetic field (B1=0 mT, B2=35 mT, B3=70 mT).

In preferred embodiments, the modified surfaces can be magnetic icephobic surfaces. FIG. 2 shows high resolution photographs of investigations conducted relating to the magnetic icephobic surfaces. FIG. 2A shows ice formation over time for a droplet of water placed on a layer of oil-based ferrofluid deposited on a silicon surface at −25° C., but without a magnet, and thus in the absence of a magnetic field. Adding a droplet of water to the surface results in the ferrofluid pulling the droplet down (due to the surface tension between water and the ferrofluid) toward the surface, allowing the droplet to touch the cold surface. When the droplet of water touches the surface, nucleation and subsequent freezing occurs very rapidly. By contrast, FIG. 2B shows the dynamics of a droplet of water placed on the same ferrofluid deposited on the same silicon surface at the same temperature when subjected to an increasing magnetic field from a magnet located underneath the silicon surface. The magnet was a permanent neodymium magnet. The magnetic field was increased from 0 mT (B1) to 35 mT (B2) to 70 mT (B3) by varying the distance of the magnet to the substrate. Applying a magnetic field results in the droplet of water being pushed to the surface of the ferrofluid film and away from the substrate due to the magnetic force and the attraction of the ferrofluid toward the magnet. The characteristic peaks and valleys that form in a ferrofluid when exposed to a magnetic field can be seen in FIG. 2B, particularly in the second and third images. The scale bar in FIG. 2B is 1 mm. In this situation, with the magnetic field present, the droplet of water will not touch the underlying silicon surface.

Figure 2C:
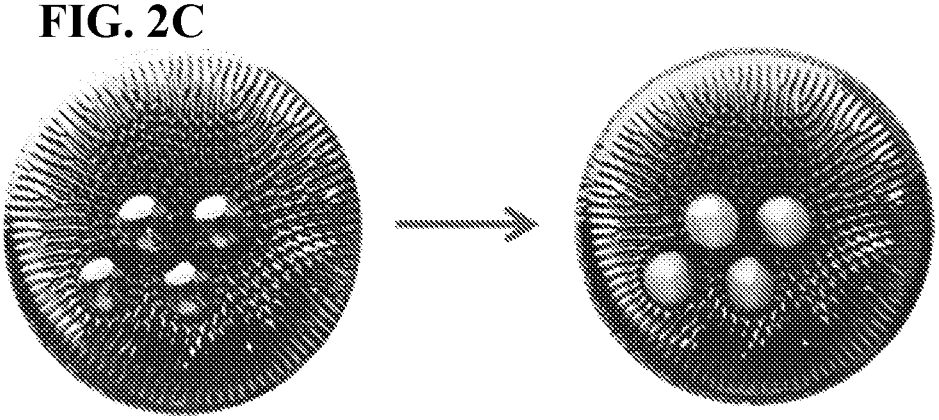
FIG. 2C shows a high resolution photograph of freezing delay for droplets of water on ferrofluid subjected to a strong magnetic field.
Figure 2D:
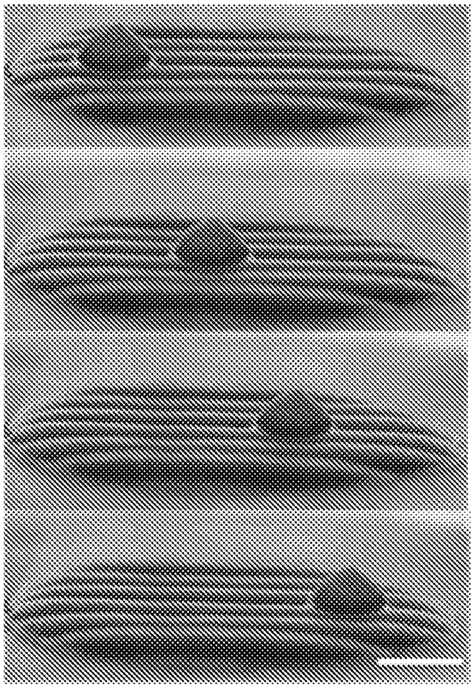
FIG. 2D shows a high resolution photograph of ice rolling off of ferrofluid at an angle of tilt of 2.6 degrees and over time from top to bottom, t=0, 5, 10, and 15 seconds.

A large freezing delay is observed when a magnetic field is applied to the ferrofluid. In comparison, when no magnetic field is applied, there is almost no delay in freezing. FIG. 2C shows a freezing delay for a strong magnetic field used with an example of the present icephobic surfaces. Increasing the magnetic field increases the freezing delay. The magnetic field intensity was 347 mT and was applied using a permanent neodymium magnet. The scale bar in FIG. 2C is 1 cm, and the freezing delay was 27 hours at a temperature of −25° C. There is no contact between the solid surface and water in the present magnetic icephobic surfaces. With almost any degree of tilt, or even the slightest force, ice can be removed from the ferrofluid surface. FIG. 2D shows the effect of surface tilt on a droplet of water placed on a layer of ferrofluid in an example of the magnetic icephobic surfaces. The ice freely rolls off of the surface. In FIG. 2D, the substrate was a plastic and magnetic tape was used as the source of magnetic field. The angle of tilt was 2.6 degrees and the photographs from top to bottom represent a time t=0, 5, 10, and 15 seconds respectively, at a temperature of −30° C. The scale bar in FIG. 2D is 5 mm.

The magnetic surfaces of the present disclosure are a combination of a magnetic field, a substrate, and oil-based magnetic liquid. The surfaces can be classified and adjusted based on three primary criteria: (1) the type of magnetic liquid, (2) the thickness of the magnetic liquid layer, and (3) the normal magnetic field. Any type of magnetic liquid can be used, so long as it is capable of being attracted to a magnet. The thickness of the magnetic liquid layer can be anywhere between about 10 nm and about 10 mm. The magnet can be any suitable type of magnet that provides a magnetic field, including permanent magnets and electrical coils and the magnetic field can be anywhere between about 1 mT and about 10 T. The magnet is placed at a desired distance underneath or above the substrate. The distance between the substrate and magnet is important, but only as it relates to producing the magnetic field. The distance specifies the strength of magnetic field the magnetic liquid will experience. In some embodiments, a magnetic substrate is used. After the magnet and substrate are in place, a desired amount of magnetic fluid is added. By adjusting these criteria, the characteristics of the magnetic surfaces can be effectively tuned.

Preferred embodiments of the present disclosure relate to a modified surface that includes a substrate having an upper surface, a layer of magnetic fluid located on the upper surface of the substrate, and a magnet located beneath the substrate, wherein the magnet produces a magnetic field that contacts the layer of magnetic liquid. In additional preferred embodiments, the magnet is located above the substrate. In further preferred embodiments, a magnetic substrate is used rather than a separate magnet and substrate. In additional preferred embodiments, the magnetic fluid is a ferrofluid. In additional embodiments the ferrofluid is oil-based. In further preferred embodiments, the layer of magnetic liquid has a thickness of about 10 nm to about 10 mm. In further preferred embodiments of the modified magnetic surface, the magnetic field has a strength of about 1 mT to about 10 T.

The present modified surfaces can be icephobic surfaces in preferred embodiments. The modified surfaces use a liquid layer, but instead of using liquid-infused micro/nanostructures, magnetized ferrofluids are used to achieve a supericephobic effect. Oil-based ferrofluids are immiscible with water. The present surfaces offer a wide range of advantages including longevity, applicability to any surface, self-healing, tunability, ease of manufacturing, and ability to withstand high shear stresses. Also, a complete negation of pinning and large freezing delays are observed. The modified surfaces can utilized in conjunction with any surface and will repel water droplets as well as increase the freezing delay of water droplets at cold temperatures. Also, for high magnetic fields, water droplets will not freeze until the temperature drops below −30° C.

Additional preferred embodiments of the present disclosure relate to a method for remote manipulation of a liquid droplet on a surface, comprising the steps of depositing a layer of magnetic liquid on an upper portion of the surface, placing a magnet beneath the surface, wherein the magnet produces a magnetic field that contacts the layer of magnetic liquid, to produce a modified magnetic surface, placing a liquid droplet on the modified magnetic surface, and using a local heat source to induce movement of the droplet without contacting the droplet with the local heat source. In additional preferred embodiments, the magnetic liquid is a ferrofluid. In other embodiments, the ferrofluid is oil-based. In further preferred embodiments, the layer of magnetic liquid has a thickness of about 10 nm to about 10 mm. In further preferred embodiments of the modified magnetic surface, the magnetic field has a strength of about 1 mT to about 10 T. In additional preferred embodiments, the local heat source is a heated pin or heated tweezers. In some embodiments, the local heat source is used to induce movement of the droplet without contacting the layer of magnetic liquid or the droplet.

Figure 3A:
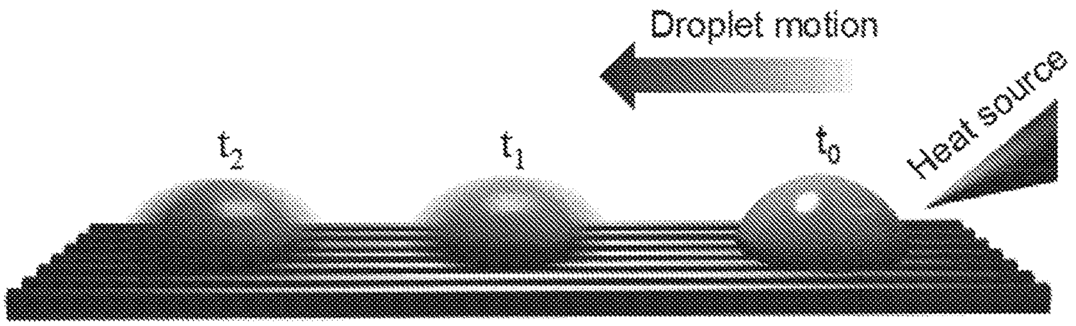
FIG. 3A shows a schematic of non-contact motion of a droplet on a modified magnetic surface in accordance with a preferred embodiment of this disclosure.
Figure 3B:
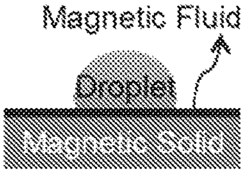
FIG. 3B shows a representation of a modified magnetic surface having a magnetic fluid on a magnetic solid, with a droplet on the surface, in accordance with a preferred embodiment of this disclosure.
Figure 3C:
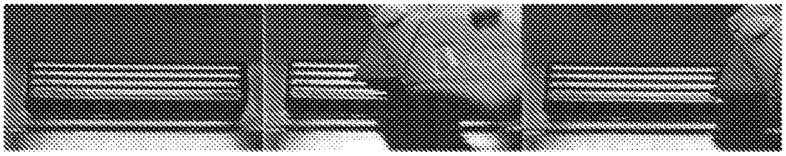
FIG. 3C shows a representation of a modified magnetic surface (left) being scratched with a blade (middle), and showing no change (right).

FIG. 3A shows a schematic of non-contact motion of a droplet on an embodiment of the modified magnetic surface. The surface provides a molecularly smooth interface for droplet motion. The induced temperature gradient on the surface by a local heat source and consequently thermocapillary flow leads to locomotion of the droplet. FIG. 3B shows a representation of a droplet on a preferred embodiment of the modified magnetic surface. The thin magnetic film is locked on the surface by the imposed magnetic force. The magnetic force is introduced by a permanent magnet which may be close to the substrate or may be the substrate itself, if it has magnetic characteristics. It is notable that characteristics of the modified surface are independent of the underlying solid substrate. The modified surface also has self-healing characteristics. As shown in FIG. 3C, even with a scratch of a blade on the underlying substrate, no change occurs on the characteristics of these surfaces.

Figure 3D:
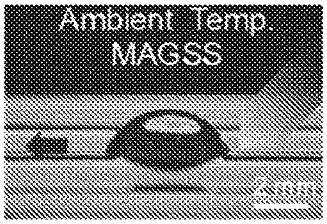
FIG. 3D shows a representation of motion of a droplet on an embodiment of a modified magnetic surface at room temperature using hot tweezers.
Figure 3E:
FIG. 3E shows a representation of motion of a droplet on an embodiment of a modified magnetic surface at a cold temperature using room temperature tweezers.

FIG. 3D shows a representation of motion of a droplet on an embodiment of the modified surface at room temperature. In this embodiment, only a pair of hot tweezers in non-contact mode is required to displace the droplet. FIG. 3E shows a representation of motion of a droplet on an embodiment of the modified surface at a cold temperature. In this embodiment, tweezers at room temperature can easily move the droplet. In this approach, the motion of the thin film of magnetic liquid leads to locomotion of the droplet.

Figure 4A:
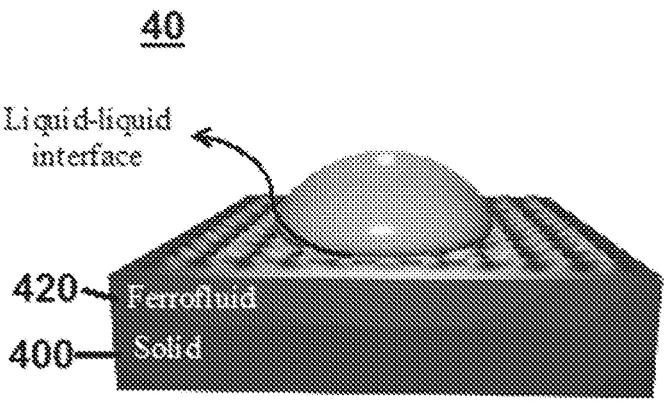
FIG. 4A shows a surface in accordance with a preferred embodiment of this disclosure.

FIG. 4A is a diagram of a preferred embodiment of a surface 40 in accordance with the present disclosure. In certain embodiments, the surface 40 includes a solid substrate 400 which may be a magnetic substrate. The substrate 400 may be a composite that includes a polymer matrix, which is obtained with dispersed magnet nanoparticles having high magnetization, such as $Nd_2Fe_{14}B$. The choice of polymer is based on its high flexibility, low cost, and durability under high stress, but any suitable polymer can be used. The choice of magnetic nanoparticles is based on their high magnetization and can be any suitable magnetic nanoparticles. On an upper surface of the substrate 400 is a layer of magnetic fluid 420, such as ferrofluid.

Figure 4B:
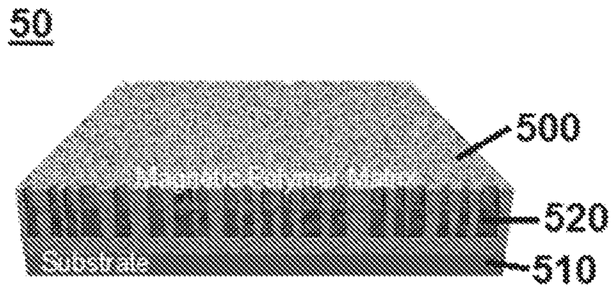
FIG. 4B shows a surface in accordance with a preferred embodiment of this disclosure, at ambient temperature.
Figure 4C:
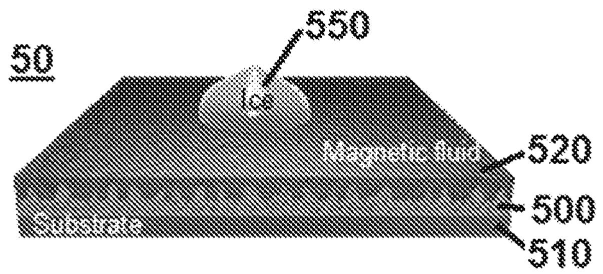
FIG. 4C shows a surface in accordance with a preferred embodiment of this disclosure, at reduced temperature.

FIG. 4B is a diagram of a preferred embodiment of a surface 50 at ambient temperature. Surface 50 includes substrate 510, which may be a metal surface, and a magnetic flexible polymer matrix coating 500 located above substrate 510. At ambient temperature, a ferrofluid film 520 is contained within flexible polymer matrix coating 500. FIG. 4C is a diagram of a preferred embodiment of surface 50 at low temperature. At low temperature, ferrofluid film 520 infuses out of the flexible polymer matrix coating 500 and forms a slippery surface which has minimal adhesion to an ice droplet 550.

EXAMPLE 1

Figure 5A:
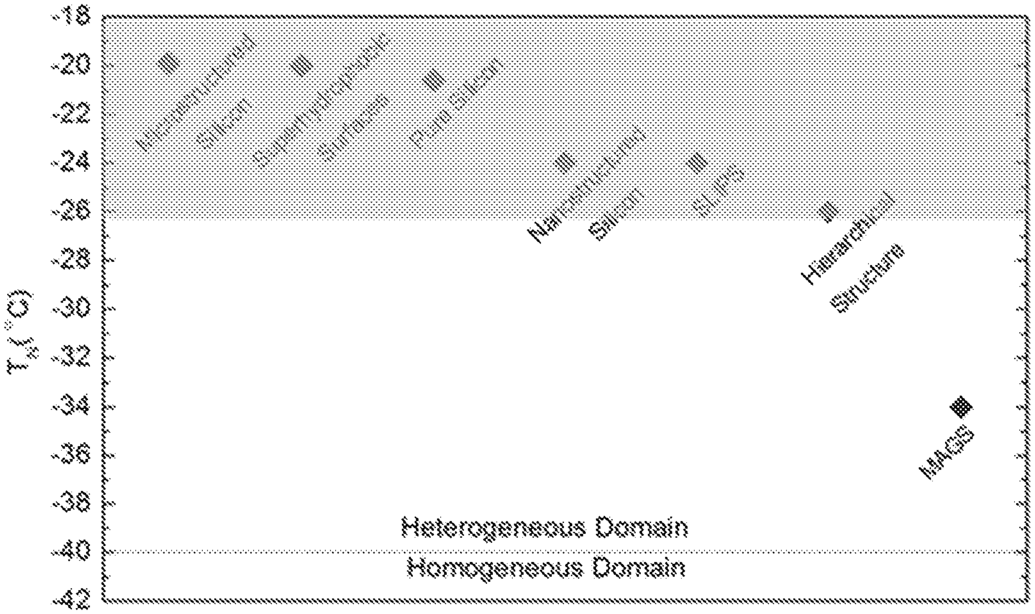
FIG. 5A shows median nucleation temperature ($T_N$) for different icephobic surfaces in heterogeneous nucleation region.
Figure 5B:
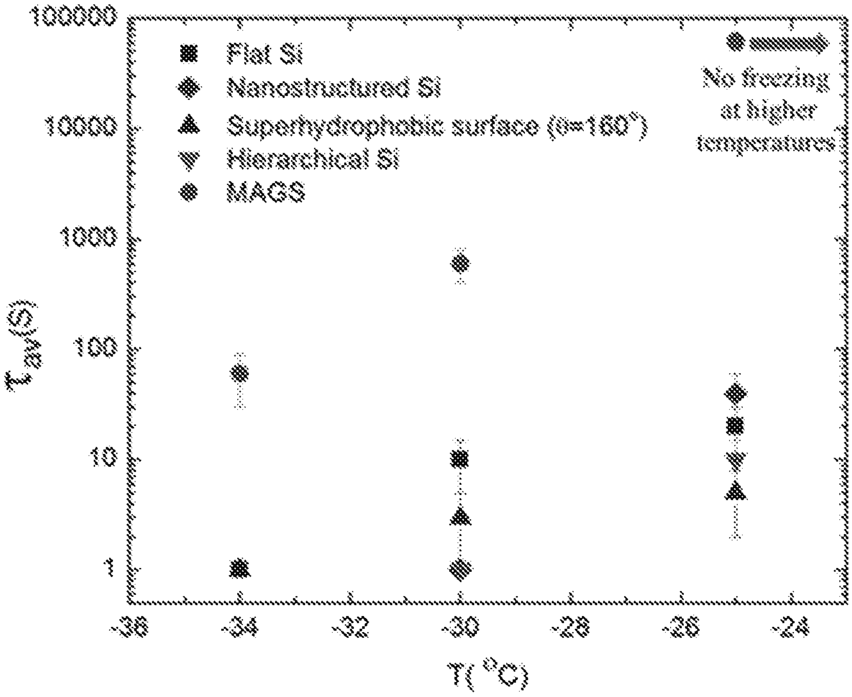
FIG. 5B shows average freezing delay for different icephobic surfaces at different temperatures.

Median nucleation temperature ($T_N$) was measured in heterogeneous nucleation region for different surfaces that were made for ice repellency. $T_N$ is defined as the ice nucleation temperature of a sessile water droplet placed on a surface when the system of droplet, surface and surrounding is cooled with a slow and quasi-equilibrium approach. An exemplary embodiment of the present magnetic icephobic surfaces (referred to in the graph as MAGS) was compared to other icephobic surfaces. The other icephobic surfaces included microstructured silicon, which was a silicon surface containing microstructures made through lithography. The microstructures were square pillars with a height of 30 microns, a pillar width of 40 microns, and a pillar spacing of 60 microns. The superhydrophobic surfaces were made of glass modified with organosilanes, as described in Wong et al., 2013. Pure silicon was a pure silicon surface. Nanostructured silicon surfaces were prepared as described in Eberle et al., 2014 and included a cryogenically etched $SiO_2$ surface with nanostructures. The hierarchical structure was also prepared as described in Eberle, et al. 2014 and included a nanostructured layer deposited on top of a microstructured silicon surface containing micro pillars about 5 μm in diameter. SLIPS refers to slippery, liquid infused porous surfaces (SLIPS) that include a lubricating liquid trapped within a nanostructured matrix, as described in Wilson et al., 2013. Results are shown in FIG. 5A. In this graph, there is a big gap between an exemplary embodiment of the present magnetic icephobic surfaces (MAGS) and other icephobic surfaces. MAGS demonstrated what is believed to be the lowest recorded $T_N$ (−34° C.). Superhydrophobic surfaces and SLIPS offer a $T_N$ range of −23 to −26° C. FIG. 5B shows the average freezing delay, or average ice nucleation delay time ($\tau_{av}$), at different temperatures for different state of the art icephobic surfaces. Average ice nucleation time is the average time required for ice nucleation of a supercooled droplet in thermal equilibrium with its surrounding. Again, MAGS shows a substantial delay compared to other surfaces, even at temperatures as low as −30° C. and −34° C. The average ice nucleation delay time was 2-3 orders of magnitude higher than the other surfaces.

The unprecedented icephobicity of the present surfaces is achieved through formation of a low energy magnetic liquid-liquid interface. In other state-of-the-art surfaces, existence of a solid-water interface limits their icephobicity. The homogeneous limit of ice nucleation in bulk water is −40° C. Also, icephobicity of the present surfaces under heating/cooling cycles was studied and no change in the icephobic characteristics was observed during cyclic performance.

Figure 5C:
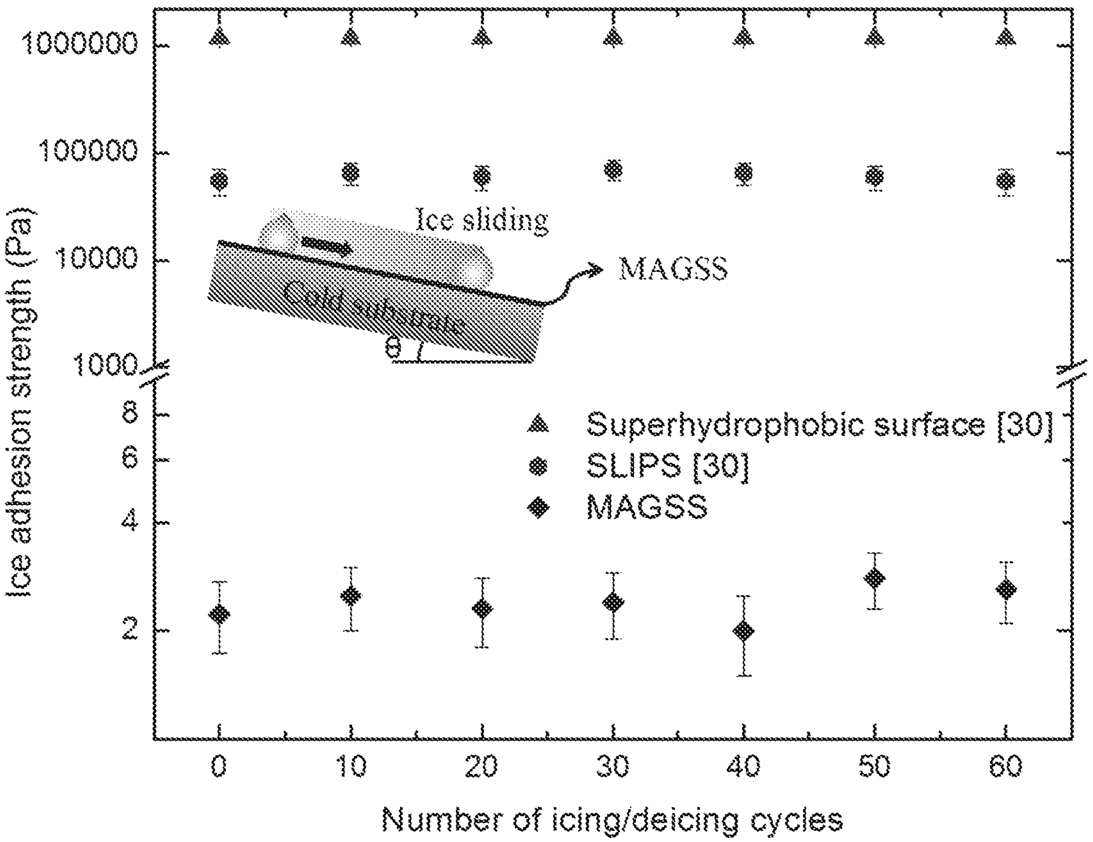
FIG. 5C shows ice adhesion strength for different icephobic surfaces.

An additional figure of merit for icephobic surfaces, in addition to median nucleation temperature ($T_N$) and average ice nucleation delay time ($\tau_{av}$) is ice adhesion strength on the surface. The ice adhesion strength on the present surfaces is measured through the required shear force for sliding of ice on the surface. The low value of shear force is induced by tilting the surface after ice formation. Results are shown in FIG. 5C. The shear strength of ice on an embodiment of the present surfaces (labeled as MAGSS) is about 2 Pa. This shear strength is five orders of magnitude lower than the reported values for superhydrophobic surfaces and SLIPS surfaces.

EXAMPLE 2

Figure 6A:
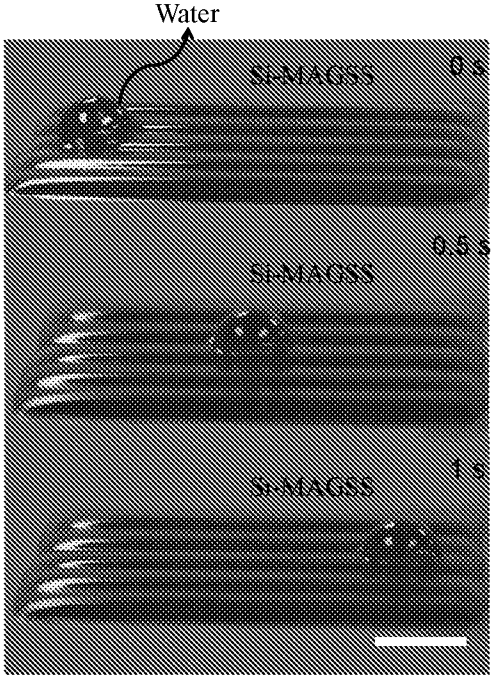
FIG. 6A shows a water droplet moving across a preferred embodiment of the present surfaces at a tile angle of 2.5°.
Figure 6B:
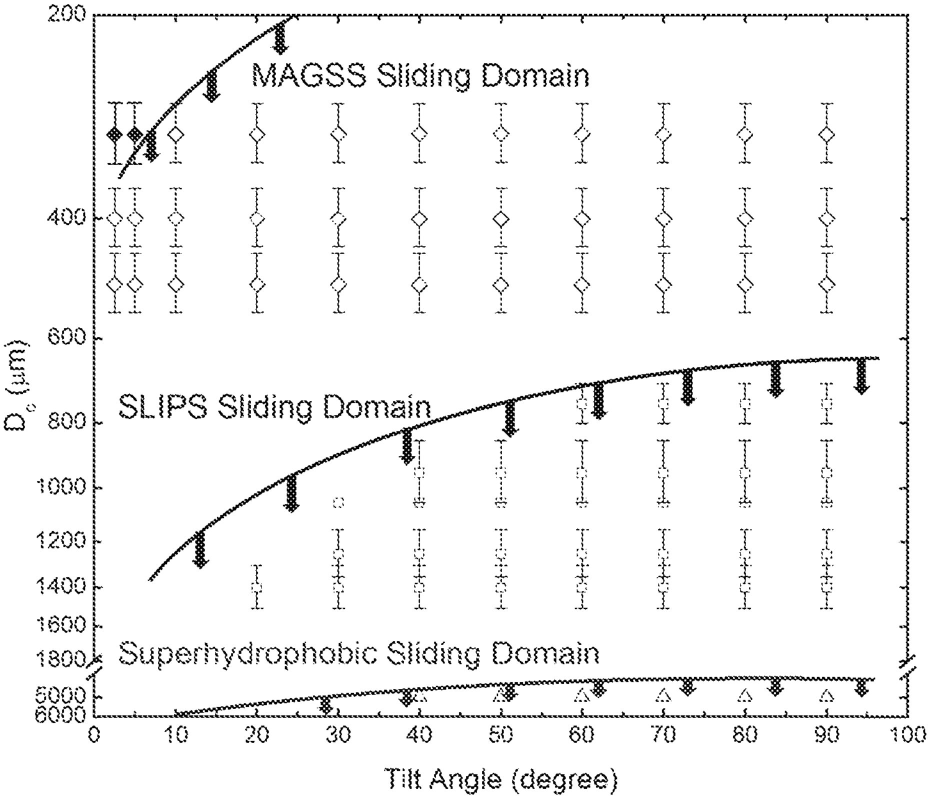
FIG. 6B shows mobility of water droplets on different icephobic surfaces at different tilt angles and droplet diameters.

Motion of water droplets on embodiments of the present surfaces (MAGSS) at a temperature of −26° C. in an ambient environment was examined, as shown in FIG. 6A. At a tilt angle of 2.5, a water droplet shows high mobility with a velocity of 37.5 mm/s on a MAGSS surface formed on a silicon wafer. Ice was also removed from the surface immediately at a velocity of 0.8 mm/s. The mobility of water droplets on MAGSS was also examined for a range of water droplets and tilt angles. Results are shown in FIG. 6B. Only at a tilt angle of <5° C. could pinning of droplets smaller than 0.3 mm in diameter be detected for the MAGSS surfaces. For larger droplets, no pinning was observed. MAGSS shows exceptional mobility compared to other state-of-the-art surfaces.

EXAMPLE 3

The motion of droplets on embodiments of the modified surfaces was studied at a range of surface temperature. The magnetic liquid used for all experiments was an oil-based ferrofluid from CMS Magnetics (Garland, Tex., Part Number: FERRO-2OZ). The density of ferrofluid used was 1064 $kg/m^3$. This ferrofluid was chosen for its high saturation magnetization and was used at a thickness of about 100 μm. The magnetic field was introduced through ferrite magnetic tape from McMaster-Carr (Elmhurst, Ill.) and Eclipse Magnetics (Sheffield, England) with magnetic field of 20 mT. Temperature of the surface was measured with IR camera (Xenics Co., Leuven, Belgium, Gobi-640-GigE). The substrate in these examples was silicon.

Figure 7A:
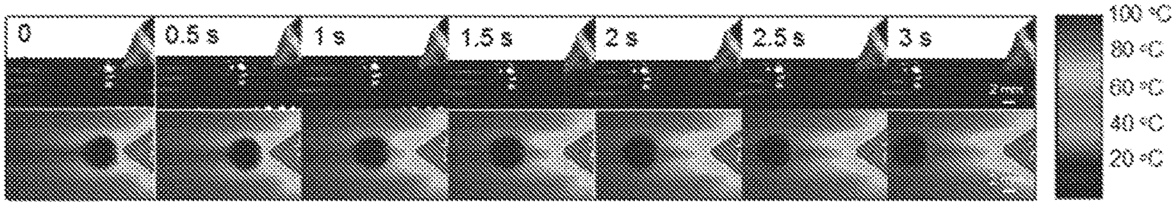
FIG. 7A shows representations of motion of a 20 μL droplet over time on an embodiment of a modified magnetic surface as a local heat source is placed in proximity, with an induced temperature gradient.

FIG. 7A shows motion of a 20 μl water droplet on the magnetic surface described above in non-contact mode. Once the local heat source, in this case a heated pin, was brought close to the surface, the droplet accelerated on the surface until it reached a maximum velocity (terminal velocity). As soon as the local heat source was brought close to the surface, the droplet started to move. Simultaneously, the temperature profile was measured. The temperature on the surface was lower than the hot pin. The induced temperature gradient on the surface led to locomotion of the droplet.

Figure 7B:
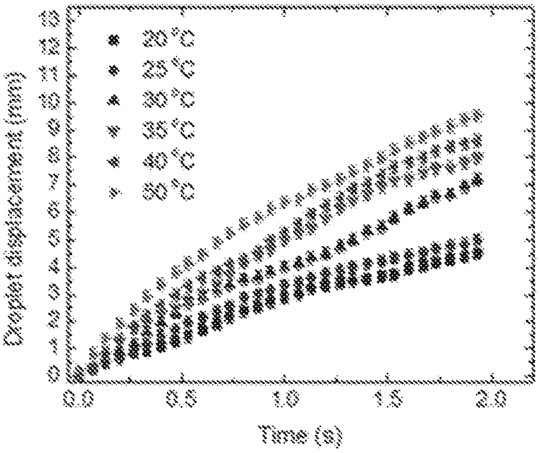
FIG. 7B shows displacement of a 10 μL water droplet as a function of time for a range of temperature differential on an embodiment of a modified magnetic surface.
Figure 7C:
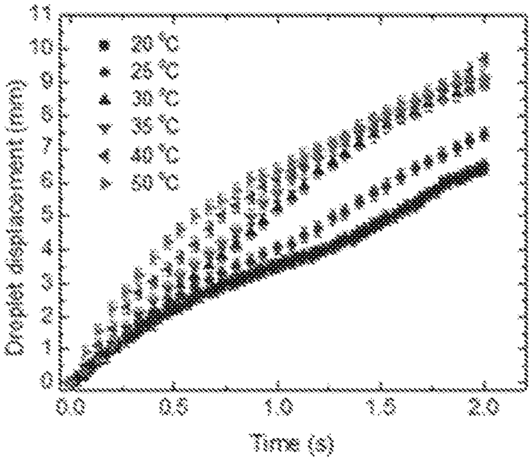
FIG. 7C shows displacement of a 20 μL water droplet as a function of time for a range of temperature differential on an embodiment of a modified magnetic surface.
Figure 7D:
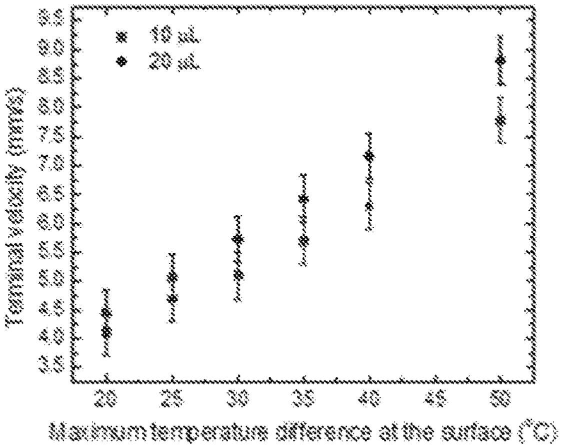
FIG. 7D shows terminal velocities of 10 μL and 20 μL droplets as a function of induced differential temperature on an embodiment of a modified magnetic surface.

The displacement of the droplet was measured as a function of time in FIG. 7B and FIG. 7C for droplet volumes of 10 and 20 μl, respectively. These displacements are shown for a range of differential temperature on the surface. The differential temperature is the maximum temperature difference on the surface. As expected, higher induced differential temperature on the modified surface increases the displacement of the droplet. Through the displacement measurements, the terminal velocity of the droplet on the modified surface was determined for two volumes of the droplet (10 μl and 20 μl). FIG. 7D shows the terminal velocity of the droplet as a function of induced differential temperature on the modified surface. These velocities are shown for two volumes of droplets. These droplets achieved a terminal velocity of 4-9 mm/s.

Figure 8:
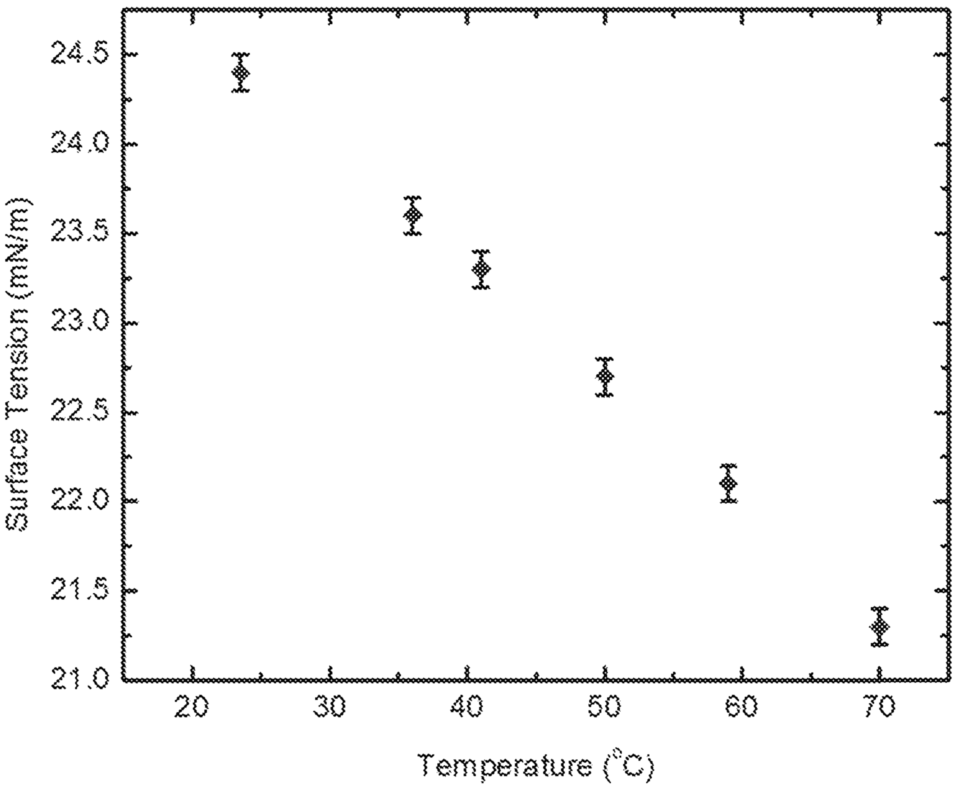
FIG. 8 shows surface tension of a magnetic liquid as a function of temperature.

The surface tension of the studied ferrofluid as a function of temperature is shown in FIG. 8. Higher terminal velocities of droplet can be obtained by tuning surface tension of the ferrofluid film.

Figure 9A:
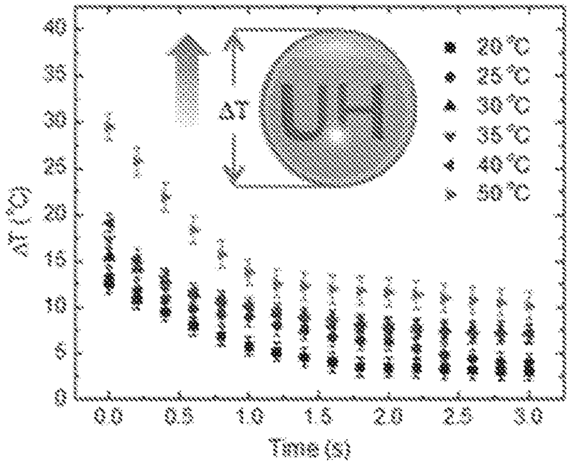
FIG. 9A shows differential temperature along a 10 μL droplet on an embodiment of a modified magnetic surface as the droplet moves on the surface as a function of time.
Figure 9B:
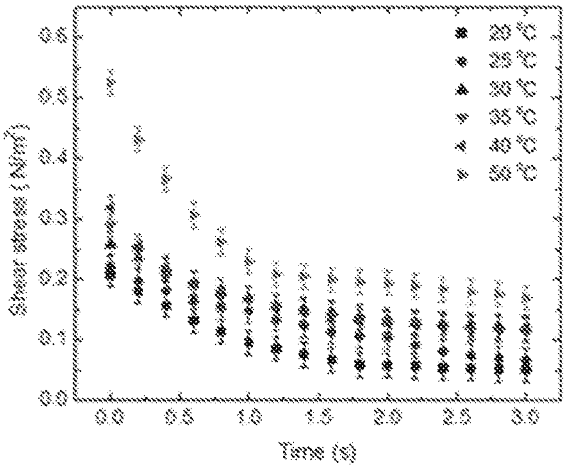
FIG. 9B shows induced shear stress on an embodiment of a modified magnetic surface as a function of time.
Figure 9C:
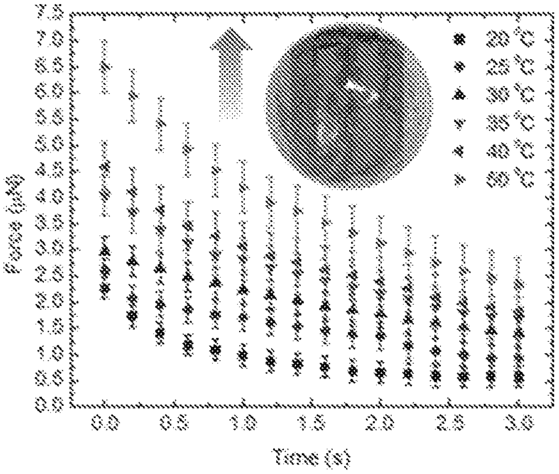
FIG. 9C shows total force imposed on a 10 μL droplet sitting on an embodiment of a modified magnetic surface as a function of time.

The induced temperature gradient on the modified surface led to a gradient in the surface tension of ferrofluid and consequently a shear stress at the ferrofluid-air interface. This shear stress (τ), which causes a forward motion, is written as $$\tau=\nabla\gamma(T).i_x \quad (1)$$

where γ(T) denotes the surface tension of ferrofluid and $i_x$ is the unity vector in the direction of droplet motion. The induced temperature gradient on the modified surface was measured along the droplet as the droplet moved over the surface, as shown in FIG. 9A. Using Equation 1, the shear stress at the ferrofluid-air interface was determined as a function of time. Results are shown in FIG. 9B. Induced temperature gradient was not uniform across the width of the droplet. Thus, the basal area of the droplet was divided in five sections and the applied shear stress was determined at each section. The determined shear stress was used to calculate total force imposed on the droplet sitting on the modified surface. As the differential temperature varied along the width of the droplet, the imposed force was calculated by taking the integral of shear stress over the contact area. This calculated shear stress along with the basal area gave the applied driving force to the droplet, which is plotted in FIG. 9C ($F=\int\tau\, dA$).

Figure 9D:
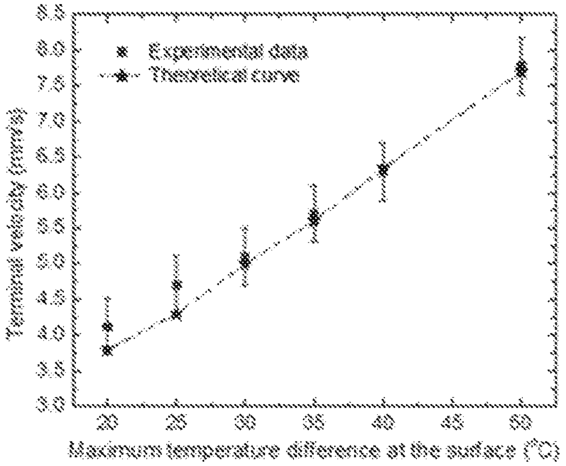
FIG. 9D shows experimental and theoretical values for terminal velocity of a 10 μL droplet on an embodiment of a modified magnetic surface as a function of the maximum temperature difference on the surface.

Given the total force, the terminal velocity can be calculated through solution of the motion equation $$m\ddot{x}+\xi\dot{x}-F=0 \quad (2)$$

where m denotes mass of the droplet, x displacement of the droplet, and ξ friction coefficient. This coefficient is written as $$\xi=\frac{\eta A}{t} \quad (3)$$

where η denotes dynamic viscosity of ferrofluid, A basal area of the droplet, and t thickness of the ferrofluid thin film, which is 100 The dynamic viscosity of the ferrofluid was measured and was 5.89 mPa·s. The calculated terminal velocity was compared with the measured velocity as shown in FIG. 9D. The good agreement between the calculated and measured terminal velocities suggests that the motion of the droplet is induced by motion of underlying magnetic liquid film. That is, the ferrofluid film is in charge of locomotion of the droplet. The induced temperature gradient on the droplet surface is small eliminating thermocapillary flow in the droplet.

Figure 10A:
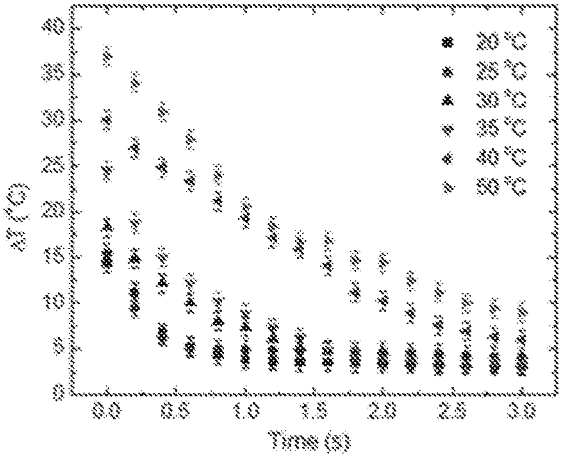
FIG. 10A shows differential temperature along a 20 μL droplet on an embodiment of a modified magnetic surface as the droplet moves on the surface as a function of time.
Figure 10B:
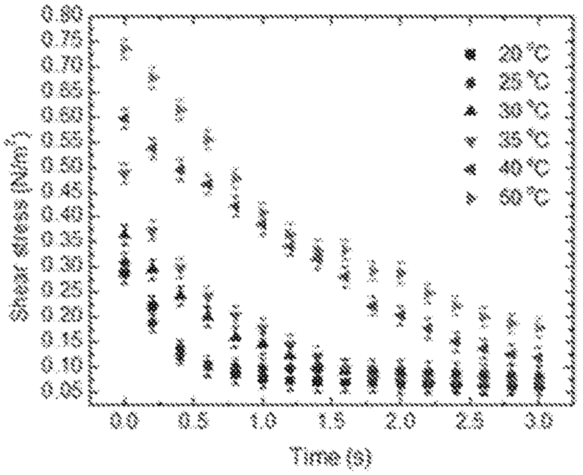
FIG. 10B shows induced shear stress on an embodiment of a modified magnetic surface as a function of time.
Figure 10C:
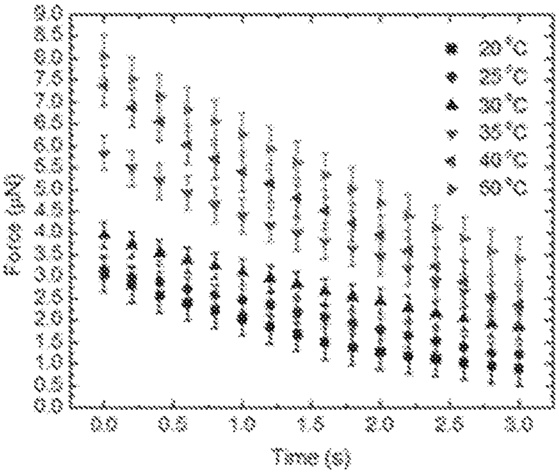
FIG. 10C shows total force imposed on a 20 μL droplet sitting on an embodiment of a modified magnetic surface as a function of time.
Figure 10D:
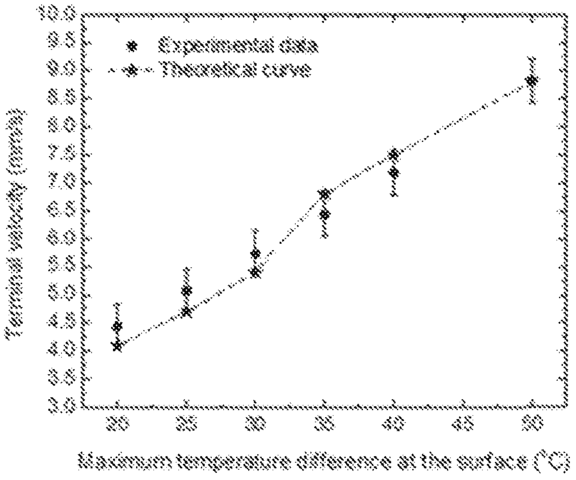
FIG. 10D shows experimental and theoretical values for terminal velocity of a 20 μL droplet on an embodiment of a modified magnetic surface as a function of the maximum temperature difference on the surface.

For a droplet with volume of 20 μl, similar calculations of terminal velocities were conducted. FIG. 10A shows the induced temperature gradient along the droplet at different temperatures of the modified surface. FIG. 10B shows the calculated shear stress based on the measured temperature. FIG. 10C shows the calculated applied force on the droplet based on measured temperature. Given the total applied force, the equation of motion was solved to determine the terminal velocity of the droplet at different temperatures of the modified surface. These terminal velocities show excellent agreement with actual measured velocities.

Figure 11A:
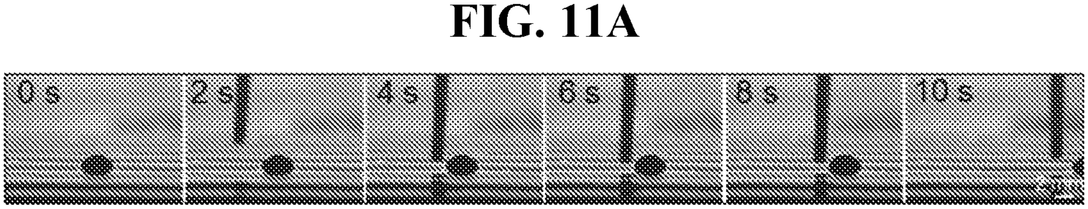
FIG. 11A shows illustrations of a droplet guided with a hot pin to an intended coordinate using an embodiment of a modified magnetic surface.
Figure 11B:
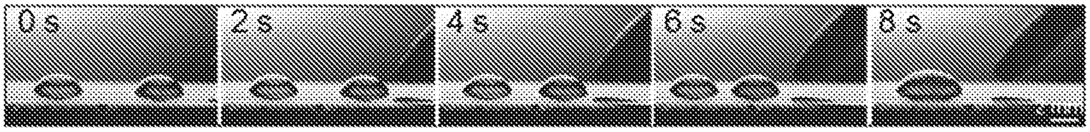
FIG. 11B shows illustrations of remote mixing of two droplets using a hot pin to guide one droplet to the other on an embodiment of a modified magnetic surface.
Figure 11C:
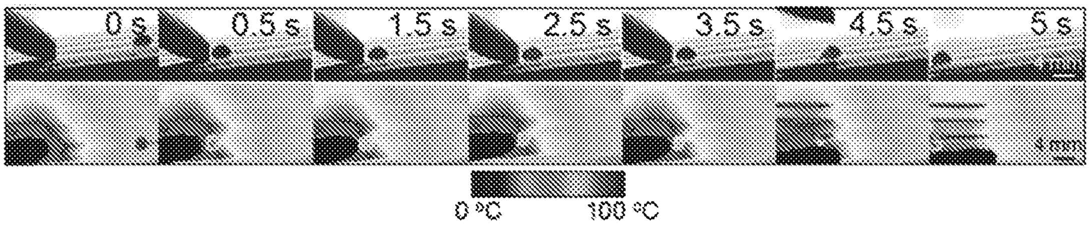
FIG. 11C shows illustrations of a hot pin and an embodiment of a modified magnetic surface used to hold a droplet on an inclined surface then release the droplet by removing the hot pin.

The present modified magnetic surfaces can be implemented in a wide range of droplet manipulation systems. FIG. 11A shows how a hot pin was used to remotely guide a droplet on an embodiment of a modified magnetic surface. With no interaction, the droplet was transported to an intended coordinate. This demonstration shows that the modified surface, when thermally activated, offers a simple platform for droplet transportation. FIG. 11B shows how the modified surface was used for mixing of two droplets. As shown, the droplets were brought closer to each other until they mixed together. Thus, the thermally-activated modified surfaces can be used in physical or chemical mixing of one or several droplets. FIG. 11C shows how the modified surface can be used to trap and release a droplet on an inclined surface. A droplet was placed on an inclined modified surface and a heated rod was placed in close contact of the surface far from the droplet. The droplet slid downward, but stopped at a distance from the heat source. At this coordinate, the downward gravitational force was balanced with the upward Marangoni thermocapillary force. Once the local heat source was removed, the droplet continued its path downward. FIG. 11C also shows the temperature gradient on the modified surface. Temperature of the droplet does not increase by more than few degrees.

Figure 11D:
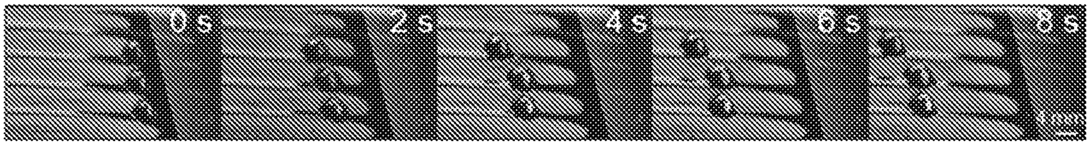
FIG. 11D shows illustrations of the motion of droplets having different viscosities on an embodiment of a modified magnetic surface.

Frictionless motion of droplets was also studied on these surfaces. Droplets with dynamic viscosity in the range of $1\text{-}10^4$ mPa·s show exceptional mobility on the surfaces. As the droplet manipulation is caused by the flow of the ferrofluid film, the motion of a droplet on the modified surfaces should be independent of viscosity of the droplet. To show this characteristic, three droplets with dynamic viscosity of 1, 5 and $10^4$ mPa·s were placed simultaneously on the modified surface and applied a temperature gradient in the x-direction. The first droplet was water, the second droplet was polymer-modified water and the last droplet was honey. All three droplets attained approximately the same terminal velocity as shown in FIG. 11D. This characteristic shows that this universal platform can be used for manipulation of droplets with a broad range of physical properties.

Figure 11E:
FIG. 11E shows illustrations of the motion of a human blood droplet on an embodiment of a modified magnetic surface.

Applicability of this platform was also studied for biomedical applications, namely remote manipulation of human blood. Peripheral Whole Blood (PB) from a healthy donor was collected in a 10 mL sterile vacutainer containing sodium heparin anticoagulant. All work outlined in this report was performed according to protocols approved by the Institutional Review Board at the University of Houston (14545-Ex). A blood droplet was deposited on an embodiment of the modified surface and a hot pin was used to manipulate the droplet on the modified surface. As shown in FIG. 11E, in a remote mode, the blood droplet was transported on the surface. This demonstration shows applicability of these modified thermally-activated surfaces for lab-on-a-chip analysis of biomedical liquids. The blood droplet can be transported with a high mobility to a required coordinate.

REFERENCES

The following documents and publications are hereby incorporated by reference.

Eberle et al., Rational nanostructuring of surfaces for extraordinary icephobicity, *Nanoscale,* 21 Feb. 2014.
Wilson et al., Inhibition of ice nucleation by slippery liquid-infused porous surfaces (SLIPS), *Phys. Chem. Chem. Phys.,* 15, pp. 581-585 (2013).
Wong et al., Preparation of transparent superhydrophobic glass slides: Demonstration of surface chemistry characteristics, *J. Chem. Educ.,* 90, pp. 1203-1206 (2013).
K.-C. Park, P. Kim, A. Grinthal, N. He, D. Fox, J. C. Weaver, J. Aizenberg, Nature 2016, 531, 78.
L. Oberli, D. Caruso, C. Hall, M. Fabretto, P. J. Murphy, D. Evans, Adv. Colloid Interface Sci. 2014, 210, 47.
D. Quéré, Reports Prog. Phys. 2005, 68, 2495.
N. Miljkovic, R. Enright, Y. Nam, K. Lopez, N. Dou, J. Sack, E. N. Wang, Nano Lett. 2013, 13, 179.
J. Ju, H. Bai, Y. Zheng, T. Zhao, R. Fang, L. Jiang, Nat. Commun. 2012, 3, 1247.
Y. Zheng, H. Bai, Z. Huang, X. T. et al, Nature 2010, 463, 640.
J. Ju, K. Xiao, X. Yao, H. Bai, L. Jiang, Adv. Mater. 2013, 25, 5937.
H. Bai, L. Wang, J. Ju, R. Sun, Y. Zheng, L. Jiang, Adv. Mater. 2014, 26, 5025.
E. M. Chan, A. P. Alivisatos, R. A. Mathies, J. Am. Chem. Soc. 2005, 127, 13854.
T. Taniguchi, T. Torii, T. Higuchi, Lab Chip 2002, 2, 19.
R. Dangla, S. C. Kayi, C. N. Baroud, Proc. Natl. Acad. Sci. U.S.A. 2013, 110, 853.
R. Seemann, M. Brinkmann, T. Pfohl, S. Herminghaus, Rep. Prog. Phys. 2012, 75, 16601.
S.-Y. Teh, R. Lin, L.-H. Hung, A. P. Lee, Lab Chip 2008, 8, 198.
M. Joanicot, A. Ajdari, Science (80-.). 2005, 309, 887.
M. T. Guo, A. Rotem, J. a. Heyman, D. a. Weitz, Lab Chip 2012, 12, 2146.
P. Irajizad, N. Farokhnia, H. Ghasemi, Appl Phys Lett 2015, 107, 191601.
Y. Zhang, T. H. Wang, Adv. Mater. 2013, 25, 2903.
A. Davanlou, R. Kumar, Sci. Rep. 2015, 5, 9531.
Y. T. Tseng, F. G. Tseng, Y. F. Chen, C. C. Chieng, Sensors Actuators, A Phys. 2004, 114, 292.
A. Würger, J. Fluid Mech. 2014, 752, 589.
H. Ghasemi, C. A. Ward, Phys. Rev. Lett. 2010, 105, 136102.
E. Yakhshi-Tafti, H. J. Cho, R. Kumar, Appl. Phys. Lett. 2010, 96, 15.
H. Ghasemi, C. A. Ward, J. Phys. Chem. C 2011, 115, 21311.
M. K. Chaudhury, G. M. Whitesides, Science (80-.). 1992, 256, 1539.
K. Ichimura, S.-K. Oh, M. Nakagawa, Science (80-.). 2000, 288, 1624.
S. Daniel, M. K. Chaudhury, J.-C. Chen, Science (80-.). 2001, 291, 633.
L. Florea, K. Wagner, P. Wagner, G. G. Wallace, F. Benito-Lopez, D. L. Officer, D. Diamond, Adv. Mater. 2014, 26, 7339.
H. Ghasemi, C. A. Ward, J. Phys. Chem. B 2009, 113, 12632.
M. G. Pollack, R. B. Fair, A. D. Shenderov, Appl. Phys. Lett. 2000, 77, 11.
M. Abdelgawad, S. L. S. Freire, H. Yang, A. R. Wheeler, Lab Chip 2008, 8, 672.
S. Daniel, M. K. Chaudhury, P. G. De Gennes, Langmuir 2005, 21, 4240.
P. Brunet, J. Eggers, R. D. Deegan, Phys. Rev. Lett. 2007, 99, 3.
S. Daniel, M. K. Chaudhury, Langmuir 2002, 18, 3404.
O. D. Velev, B. G. Prevo, K. H. Bhatt, Nature 2003, 426, 515.
P. R. C. Gascoyne, J. V Vykoukal, J. a Schwartz, T. J. Anderson, D. M. Vykoukal, K. W. Current, C. McConaghy, F. F. Becker, C. Andrews, Lab Chip 2004, 4, 299.
M. Abdelgawad, A. R. Wheeler, Adv. Mater. 2007, 19, 133.
S.-K. Fan, T.-H. Hsieh, D.-Y. Lin, Lab Chip 2009, 9, 1236.
J. Hong, Y. K. Kim, D.-J. Won, J. Kim, S. J. Lee, Sci. Rep. 2015, 5, 10685.
H. Mertaniemi, V. Jokinen, L. Sainiemi, S. Franssila, A. Marmur, O. Ikkala, R. H. A. Ras, Adv. Mater. 2011, 23, 2911.
D. 't Mannetje, S. Ghosh, R. Lagraauw, S. Otten, A. Pit, C. Berendsen, J. Zeegers, D. van den Ende, F. Mugele, Nat. Commun. 2014, 5, 3559.
Z. Wang, J. Zhe, Lab Chip 2011, 11, 1280.
X. Ding, P. Li, S.-C. S. Lin, Z. S. Stratton, N. Nama, F. Guo, D. Slotcavage, X. Mao, J. Shi, F. Costanzo, T. J. Huang, Lab Chip 2013, 13, 3626.
A. Wixforth, C. Strobl, C. Gauer, A. Toegl, J. Scriba, Z. V. Guttenberg, Anal. Bioanal. Chem. 2004, 379, 982.
H. Van Phan, T. Alan, A. Neild, Anal. Chem. 2016, 88, 5696.
S. Li, X. Ding, F. Guo, Y. Chen, M. I. Lapsley, S. C. S. Lin, L. Wang, J. P. McCoy, C. E. Cameron, T. J. Huang, Anal. Chem. 2013, 85, 5468.
J. K. Valley, S. N. Pei, S. Ningpei, A. Jamshidi, H.-Y. Hsu, M. C. Wu, Lab Chip 2011, 11, 1292.
H. S. Chuang, A. Kumar, S. T. Wereley, Appl. Phys. Lett. 2008, 93, 1.
P. Y. Chiou, H. Moon, H. Toshiyoshi, C. J. Kim, M. C. Wu, Sensors Actuators, A Phys. 2003, 104, 222.
N. J. Cira, A. Benusiglio, M. Prakash, Nature 2015, 519, 446.
P.-G. De Gennes, F. Brochard-Wyart, D. Quéré, Capillarity and Wetting Phenomena: Drops, Bubbles, Pearls, Waves, Springer Science & Business Media, 2004.
G. McHale, M. I. Newton, Soft Matter 2015, 11, 2530.
T. Arbatan, L. Li, J. Tian, W. Shen, Adv. Healthc. Mater. 2012, 1, 80.
P. Aussillous, D. Quéré, Nature 2001, 411, 924.
Y. Zhao, J. Fang, H. Wang, X. Wang, T. Lin, Adv. Mater. 2010, 22, 707.
Y. Xue, H. Wang, Y. Zhao, L. Dai, L. Feng, X. Wang, T. Lin, Adv. Mater. 2010, 22, 1.
Y. Zhao, Z. Xu, H. Niu, X. Wang, T. Lin, Adv. Funct. Mater. 2015, 25, 437.
M. Paven, H. Mayama, T. Sekido, H. J. Butt, Y. Nakamura, S. Fujii, Adv. Funct. Mater. 2016, 1.
P. Irajizad, M. Hasnain, N. Farokhnia, S. M. Sajadi, and H. Ghasemi, Nature Communications, 13395, 2016.

What is claimed is:

1. A method for improving icephobicity of a material, comprising:

depositing a layer of magnetic fluid on a surface of the material, wherein the magnetic fluid is an oil-based ferrofluid; and placing a magnet in proximity to the surface, wherein the magnet produces a magnetic field that contacts the layer of magnetic fluid, and wherein the magnetic field holds the layer of magnetic fluid on the surface to coat the surface, and wherein the layer of magnetic fluid on the surface of the material improves icephobicity of the material due to immiscibility of water with the layer of magnetic fluid and attraction of the layer of magnetic fluid to the magnet.

2. The method of claim 1, wherein the magnet is placed above or beneath the surface.

3. The method of claim 1, wherein the layer of magnetic fluid has a thickness of about 10 nm to about 10 mm.

4. The method of claim 1, wherein the magnetic field has a strength of about 1 mT to about 10 T.

* * * * *